Feb. 8, 1938. H. G. M. KUHN 2,107,989
GARDEN LINE STAKE
Filed July 21, 1936
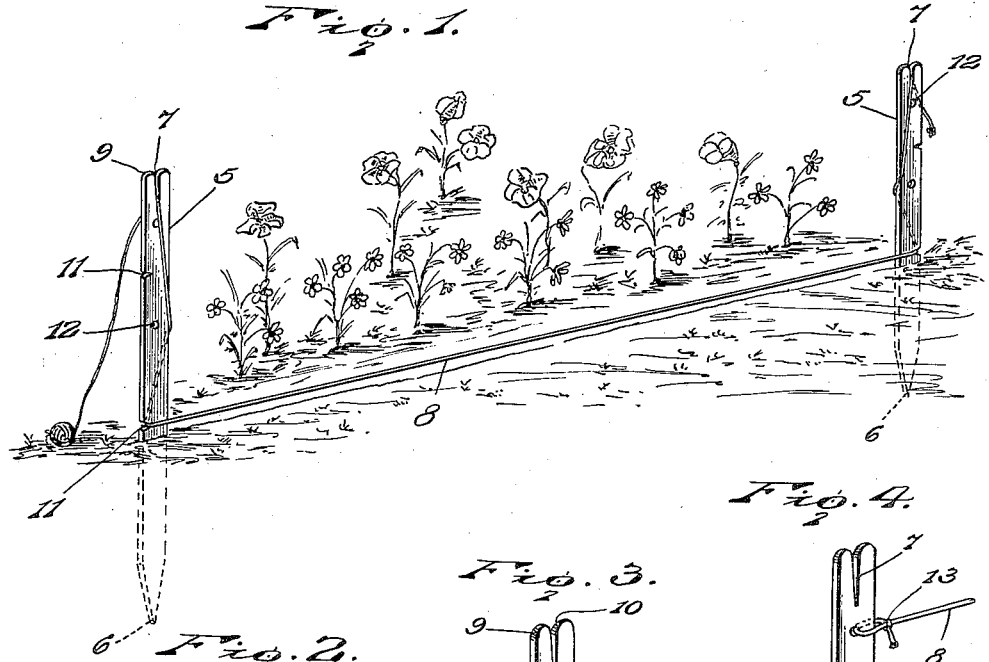
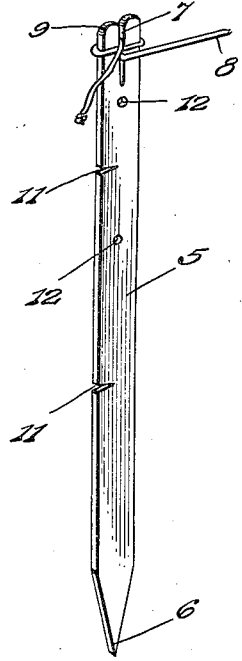
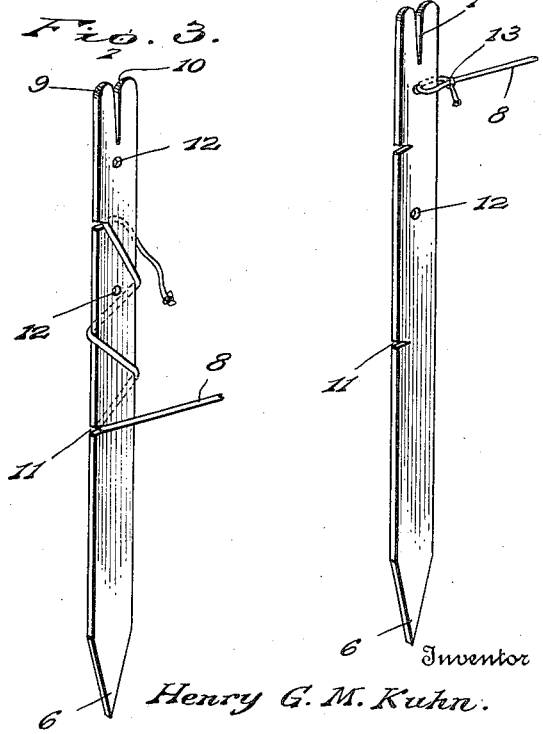
Inventor
Henry G. M. Kuhn.
By Lacy & Lacy,
Attorneys Patented Feb. 8, 1938

2,107,989

UNITED STATES PATENT OFFICE 2,107,989

GARDEN LINE STAKE

Henry G. M. Kuhn, Spencertown, N. Y.

Application July 21, 1936, Serial No. 91,793

3 Claims. (Cl. 33—86)

This invention relates to garden stakes and more particularly to a metallic stake for holding the ends of a cord or other flexible straight edge when laying out garden rows or edging flower beds, sidewalks and the like.

The object of the invention is to provide a comparatively simple and inexpensive device of the character described adapted to be driven into the ground at spaced intervals to form anchoring elements for a cord or other flexible straight edge when laying out garden rows and the like and by means of which a cord or straight edge may be held taut and parallel with an adjacent row without the necessity of tying the cord around the stakes each time the length of the cord is changed.

A further object of the invention is to provide a garden stake comprising a flat elongated body portion having one end thereof pointed and its other end provided with a vertical slot or kerf adapted to receive and clamp the adjacent end of a cord, there being horizontal kerfs formed in one edge of the body portion to permit the cord to be supported at any desired height with respect to the stake.

A further object is to provide the stake with one or more transverse openings which may be used under certain conditions either for fastening the cord to the stake or for suspending said stake from a nail or other support when not in use.

A still further object of the invention is generally to improve this class of devices so as to increase their utility, durability and efficiency.

In the accompanying drawing forming a part of this specification and in which similar numerals of reference indicate corresponding parts in all the figures of the drawing, Figure 1 is a perspective view of my improved garden stake showing one method of supporting a cord or other flexible straight edge.

Figure 2 is a perspective view of one of the stakes showing the manner of clamping the cord when the ground is soft or irregular and it is necessary to drive the stake into the ground for a considerable distance.

Figure 3 is a similar view showing a different manner of clamping the cord to the stake.

Figure 4 is a similar view showing how the cord may be tied to the stake if desired.

The improved garden stake forming the subject-matter of the present invention comprises a flat elongated body portion 5 preferably formed of metal and having its lower end pointed, at 6, and adapted to be driven into the ground for anchoring the stake adjacent a garden row, flower bed or the like. Formed in the upper end of the body portion 5 is a vertically disposed slot or kerf 7 adapted to receive and clamp the adjacent end of a cord or other flexible straight edge, indicated at 8. The top of the body portion 5 is preferably curved or rounded, at 9, so as not to present any sharp edges which would tend to cut or sever the cord and the walls of the stake at the mouth of the slot or kerf 7 are preferably curved laterally, at 10, to assist in guiding the cord within the kerf when fastening said cord to the stake.

One longitudinal edge of the body portion 5 is formed with spaced transverse kerfs 11 adapted to receive and clamp the cord under certain conditions and extending transversely through said body portion are one or more openings 12, one of which is preferably disposed immediately below the kerf 7. The stakes may be of any desired lengths but it is preferred that they be approximately eighteen inches long and the slots or kerfs used will depend on the firmness of the soil and the depth to which the stakes will have to be forced into the ground to form a firm anchorage.

When the ground is relatively firm and solid, the stakes are positioned adjacent a flower bed, garden row or the like and driven into the ground until the lower transverse kerf 11 is approximately one inch above the surface of the ground, after which one end of the cord 8 is pressed downwardly within the kerf 7 of one of the stakes and thence brought downwardly and twisted around the body of the stake and forced into the lower transverse kerf 11. The cord is then drawn longitudinally over the surface of the ground and passed around the other stake and within the lower kerf thereof, as best shown in Figure 1 of the drawing. After this is done, a slight tension is exerted on the cord 8 so as to render it taut or tight and the end of the cord wrapped around the stake with its terminal extended upwardly and forced within the vertical kerf of the last-mentioned stake. With the parts in this position, the cord or straight edge will be disposed parallel with the surface of the ground and parallel with one edge of the plot of ground so that the rows will be even and uniform.

In order to release the cord, it is merely necessary to exert a slight upward pull on one end thereof which will disengage the cord from the adjacent vertical kerf, as will be readily understood. If it is desired to increase or decrease the distance between the stakes, this may be readily accomplished by releasing the cord from engagement with one of the stakes and moving said stake the desired distance. By then exerting a longitudinal tension on the cord and inserting said cord within the adjacent transverse kerf of the newly positioned stake and forcing the end of the cord within the vertical kerf, said cord will be securely anchored without the necessity of tying the cord around the stake as is customary at present.

When the soil is relatively soft necessitating driving the stake a considerable distance within the ground in order to form a firm anchorage therefor, or when the ground is hilly or uneven so that the cord under normal conditions could not be supported parallel with the ground, I employ the method shown in Figure 2 of the drawing, that is to say, insert the end of the cord within the kerf 7 and thence wrap said cord around the stake once or twice and bring the free end of the cord downwardly within the kerf so as to effectually prevent slipping of said cord. If desired, however, the cord may be secured to the stake by inserting a portion thereof within the lower transverse kerf 11 and thence passing the cord one or more times around the body of the stake with the free end thereof inserted and clamped within the upper kerf 11, as best shown in Figure 3 of the drawing.

When it is desired that the cord be permanently secured to the stake, this may be accomplished by passing one end of the cord through either of the transverse openings 12 and forming a knot therein, as indicated at 13 in Figure 4 of the drawing. When the stake is not in use, said stake may be conveniently suspended from a nail or other suitable support by means of the upper opening 12.

As the stakes are made of metal, liability of rotting, warping or breaking is reduced to a minimum and they will, therefore, last for an indefinite period.

A garden stake constructed in accordance with the present invention will materially facilitate the laying out of garden rows or the edging of flower beds, sidewalks and the like as the cord or flexible straight edge may be instantly attached to or detached from the stake, thereby effecting a material saving in time as well as labor.

It will, of course, be understood that the stakes may be made in different sizes and shapes and painted, galvanized or otherwise coated to assist in protecting them from the action of the elements.

Having thus described the invention, what is claimed as new is:

1. A garden stake comprising a flat elongated body portion having one end thereof formed with a vertical kerf adapted to receive and clamp a flexible straight edge, there being spaced transverse kerfs formed in one longitudinal edge of the body portion in spaced relation to the vertical kerf and adapted to receive a portion of said straight edge.

2. A garden stake comprising a flat elongated bar having one end thereof tapered to form a driving point and its other end provided with a vertically disposed kerf adapted to receive and clamp a cord, there being spaced transverse incisions formed in one longitudinal edge of the bar and spaced transverse openings disposed one between the transverse incisions and the other immediately below the vertical kerf.

3. A device of the class described comprising a garden stake having its lower end pointed and adapted to be driven into the ground and its upper end provided with a vertical kerf opening through the top thereof, there being transverse kerfs formed in one longitudinal edge of said stake whereby a flexible straight edge may have its intermediate portion engaged in the adjacent transverse kerf of the stake, and an end portion twisted around the stake and clamped within the vertical kerf of the stake.

HENRY G. M. KUHN.